No. 825,810. PATENTED JULY 10, 1906.
W. A. COOKE.
STOVEPIPE JOINT.
APPLICATION FILED SEPT. 23, 1905.
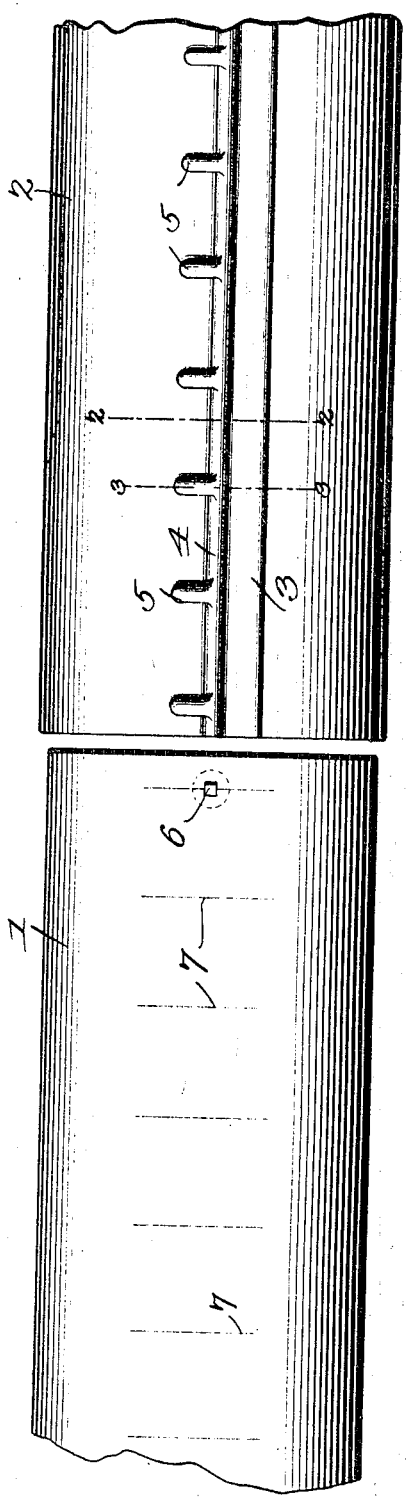
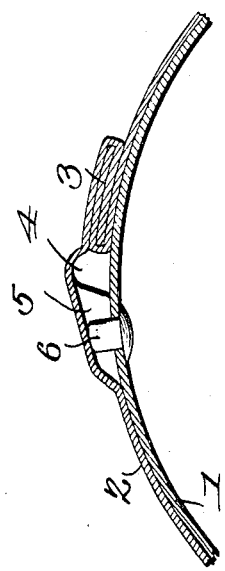
William A. Cooke,
Inventor,
by C. A. Snow & Co.
Attorneys.
Witnesses:

UNITED STATES PATENT OFFICE.

WILLIAM A. COOKE, OF ELDORADO SPRINGS, MISSOURI.

STOVEPIPE-JOINT.

No. 825,810.  Specification of Letters Patent.  Patented July 10, 1906.

Application filed September 23, 1905. Serial No. 279,820.

*To all whom it may concern:*

Be it known that I, WILLIAM A. COOKE, a citizen of the United States, residing at Eldorado Springs, in the county of Cedar and State of Missouri, have invented a new and useful Stovepipe-Joint, of which the following is a specification.

This invention relates to stovepipe-joints.

The object of the invention is to provide a simple and novel form of stovepipe-joint in the use of which adjustments of the pipe to desired lengths may be secured and in which the parts shall be held in such manner as positively to preclude accidental separation when once properly combined.

With the above and other objects in view, as will appear as the nature of the invention is better understood, the same consists in the novel construction and combination of parts of a stovepipe-joint, as will be hereinafter fully described and claimed.

In the accompanying drawings, forming a part of this specification, and in which like characters of reference indicate corresponding parts, Figure 1 is a view in elevation of two sections of pipe detached and constructed to form a joint according to the present invention. Fig. 2 is a transverse sectional view taken on the line 2 2, Fig. 1, with the sections of the pipe assembled. Fig. 3 is a similar view taken on the line 3 3, Fig. 1.

Referring to the drawings, 1 designates the male member of the joint, and 2 the female member. The female member is provided at one side of its seam 3 and parallel therewith with a longitudinally-disposed upstruck channel 4, from which project spaced lateral upstruck seats 5, of which there may be any suitable number.

The channel and seats will be formed in the metal of the member 2, preferably before the seam is made, and may be accomplished by passing the sheet of metal between rollers, one of which has its periphery provided with a patrice to indent the metal to secure the objects sought.

The male member is provided near one end with a stud 6, which is of a size and height freely to move within the channel and seats. The stud is herein shown as rectangular; but it is to be understood that it may be of any other preferred contour in cross-section. Instead of having the stud a separate element it may be struck up from the metal of the member 1, if preferred.

In order to facilitate interlocking of the lug with one of the seats when the desired adjustment has been secured, the male member is provided with graduation marks or indicators 7, that are spaced apart a distance equal to that between the seats, so that when the two members are nested and one of the graduation-marks is brought into alinement with the lower edge of the member 2 the operator will know that the lug is opposite the appropriate seat, and by giving a turn to the member 1 the interlocking of the two members will be effected.

Owing to the thickness produced at the seam 3 without a special construction of the channel 4, the circular form of the female member would be destroyed, so that there would be a space formed between the two members, through which soot, smoke, or the like could escape. To obviate this defect, the outer walls of the seats are disposed at an angle that is substantially tangential to the circumference of the member 2, thereby disposing the channel 4 on a plane sufficiently removed from the inner wall of the member to cause it to compensate for the thickness of the seam 3, whereby the circular continuity of the inner wall of the section 2 is maintained, as clearly shown by reference to Figs. 2 and 3. By the angular disposition of the seats there will be a locking relation between them and the stud 6, which will operate to hold the members properly assembled when once adjusted.

As the outer walls of the seats 5 are inclined relative to the member 2, it will be understood that when the two members have been placed in engagement with the stud 6 within one of the seats by partly rotating the member 1 within the member 2 the stud can be forced tightly against the inclined wall, which will bind thereon and act as a lock to hold the two members against accidental displacement.

The improvements herein defined while simple in character will be found thoroughly effective for the purpose designed and may be applied to stovepipes with but slight trouble and expense.

Having thus described the invention, what is claimed is—

1. In a stovepipe-joint a member provided with a longitudinal channel, and parallel-spaced seats disposed at right angles thereto, the outer walls of the seats being inclined relative to the member, and a second member having a stud to engage any one of the seats and bind upon the inclined wall thereof.

2. In a stovepipe-joint a member having an upstruck longitudinal channel and lateral upstruck seats disposed at right angles thereto, the outer walls of said seats being inclined relative to the member and said seats being of greatest depth at their receiving end and gradually diminishing toward their other end, and a second member having a stud adapted to project into any one of the seats, the inclined wall of said seat adapted to bind upon the stud to hold it against displacement within the seat, said stud-carrying member bearing indicating-marks spaced apart at distances equal to those between the seats.

In testimony that I claim the foregoing as my own I have hereto affixed my signature in the presence of two witnesses.

WILLIAM A. COOKE.

Witnesses:
  KIMBALL HILL,
  CHARLES A. EDGAR.